United States Patent
Pandey et al.

(10) Patent No.: US 12,550,006 B2
(45) Date of Patent: Feb. 10, 2026

(54) OPTIMIZED ON DEMAND DYNAMIC USAGE OF DYNAMIC BEAM-FORMATION OF RADIO ACCESS NETWORK

(71) Applicants: AT&T Communications Services India Private Limited, Karnataka (IN); AT&T Intellectual Property I, L.P., Atlanta, GA (US)

(72) Inventors: Mritunjay Pandey, Bangalore (IN); Saurav Paira, Dayton, NJ (US)

(73) Assignees: AT&T Intellectual Property I, L.P., Atlanta, GA (US); AT&T Communications Services India Private Limited, Karnataka (IN)

( * ) Notice: Subject to any disclaimer, the term of this patent is extended or adjusted under 35 U.S.C. 154(b) by 731 days.

(21) Appl. No.: 17/875,035

(22) Filed: Jul. 27, 2022

(65) Prior Publication Data
US 2024/0040434 A1 Feb. 1, 2024

(51) Int. Cl.
| | |
|---|---|
| H04W 72/04 | (2023.01) |
| G06N 20/00 | (2019.01) |
| H04L 41/12 | (2022.01) |
| H04W 16/28 | (2009.01) |
| H04W 28/20 | (2009.01) |

(52) U.S. Cl.
CPC ............ *H04W 28/20* (2013.01); *G06N 20/00* (2019.01); *H04L 41/12* (2013.01); *H04W 16/28* (2013.01)

(58) Field of Classification Search
CPC ........ H04L 43/50; H04L 41/16; H04W 24/04; H04W 24/02; H04W 24/10; H04W 24/06
USPC .......................................................... 455/423
See application file for complete search history.

(56) References Cited

U.S. PATENT DOCUMENTS

2022/0294740 A1* 9/2022 Burkhalter, Jr. ........ G06N 20/00
2024/0430738 A1* 12/2024 Eleftheriadis ..... H04W 52/0245

OTHER PUBLICATIONS

"Advanced antenna systems for 5G networks," https://www.ericsson.com/en/reports-and-papers/white-papers/advanced-antenna-systems-for-5g-networks, Jul. 1, 2022, 15 pgs.

* cited by examiner

*Primary Examiner* — Tanmay K Shah
(74) *Attorney, Agent, or Firm* — Guntin & Gust, PLC; Daniel P. Williams

(57) ABSTRACT

Aspects of the subject disclosure may include, for example, collecting network information for a mobility network, including processing the network information at a central controller serving the mobility network, building, in the central controller, a machine learning model including building the machine learning model using the network information, and allocating, by the central controller, radio channels of the mobility network based on a recommendation of the machine learning model. Other embodiments are disclosed.

20 Claims, 16 Drawing Sheets

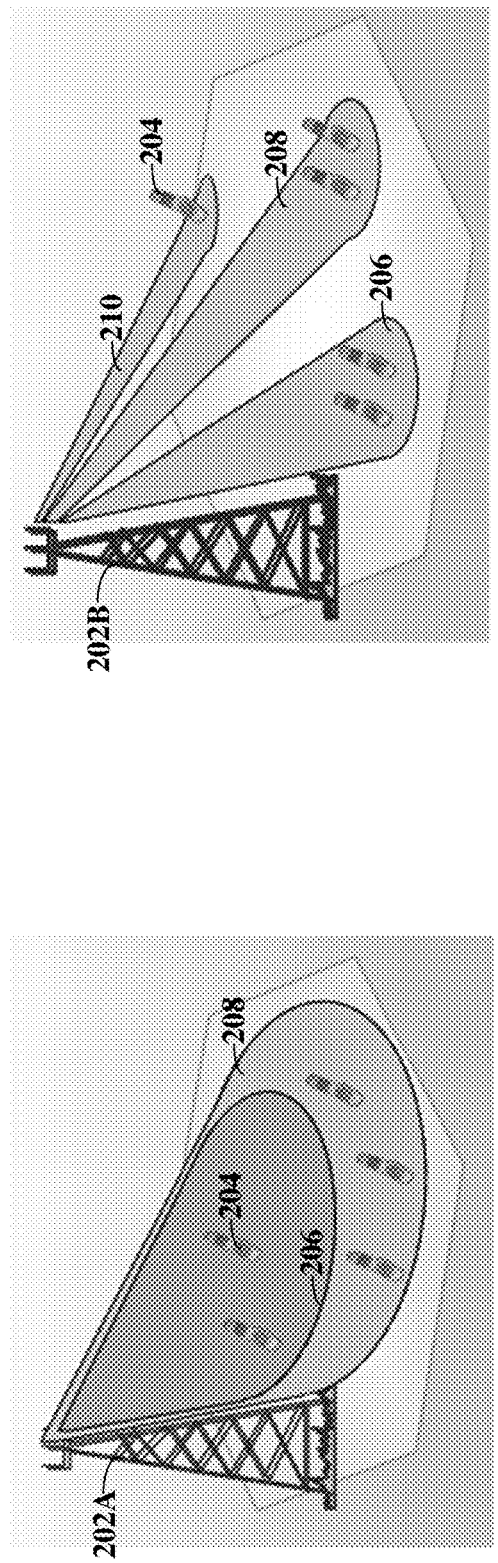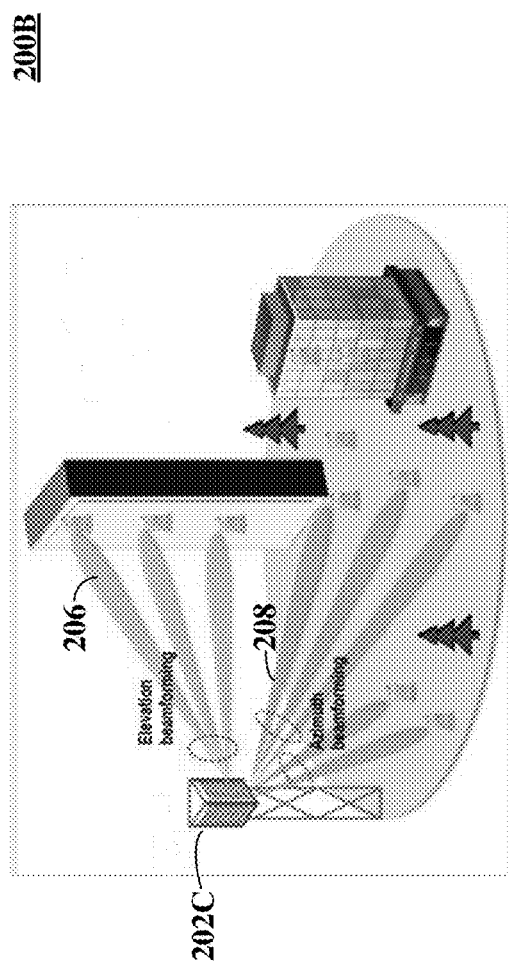
FIG. 2A

| 1. Supported Data rate |
| --- |
| 20M |
| 40M |
| 80M |
| 160M |
| 320M |
| 640M |
| 1G |
| 2.5G |
| 5G |
| 10G |
| .... |

| 2. Supported Modulation formats | |
| --- | --- |
| OFDM | ..... |
| 64QAM | PS-8QAM |
| 32QAM | PS-16QAM |
| 16QAM+32QAM | PS-32QAM |
| 16QAM+32QAM | ... |
| 8QAM+16QAM(1:3) | 2PPM-QPSK |
| 6b4D-2A8PSK+16QAM | 2PPM-8QAM |
| 8QAM+16QAM | 2PPM-nQAM |
| 7b4D-2A8PSK | ... |
| 6b4D-2A8PSK+16QAM | PM-2PPM-QPSK |
| 8QAM | PM-2PPM-8QAM |
| 6b4D-2A8PSK+16QAM | PM-2PPM-nQAM |
| QPSK+8QAM | ... |
| QPSK+6b4D-2A8PSK(1:3) | 2PPM-PM-QPSK |
| QPSK+6b4D-2A8PSK | 2PPM-PM-8QAM |
| 5b4D-2A8PSK | 2PPM-PM-nQAM |
| QPSK+8QAM(3:1) | ... |
| QPSK | 4PPM-PM-QPSK |
| 3b4D-QPSK | 4PPM-PM-8QAM |
| 4b8D-QPSK | 4PPM-PM-nQAM |
| PM-BPSK | ... |
| PM-QPSK | KiMDPM-QPSK |
| PM-8QAM | 4iMDPM-QPSK |
| PM-16QAM | 8iMDPM-QPSK |
| PM-32QAM | ... |
| PM-64QAM | 128-SP-QAM |
| PM-128QAM | 32-SP-QAM |
| PM-256QAM | SO-PM-QPSK |
| ... | 6polSK-QPSK |
| PS-QPSK | |

FIG. 2D

| | | | |
|---|---|---|---|
| Spectrum | <6 GHz | ~3 – 30 GHz | ~30 – 100 GHz |
| Bandwidth | ~5 – 100 MHz | ~50 – 400 MHz | ~400 – 2,000 MHz |
| Mobility | High | Low | Stationary |
| Duplexing | FDD/TDD | TDD | FDD/TDD |
| Waveform | CP-OFDMA/DFT-S-OFDM | CP-OFDM | TDMA based OFDM |
| User Density | Medium | High | Low |
| # of Simultaneous Users | Tens of UEs in a large coverage area | Few UEs in a small coverage area | One UE at a time |
| Channel Characteristics | Rich multipath | Few propagation paths | Few propagation paths |
| Spectral Efficiency | High (spatial multiplexing) | Low (few UEs, large pathloss) | Low (few UEs, large pathloss) |
| MIMO | Exploit spatial multiplexing SU- and MU-MIMO | Exploit beam forming SU- and MU-MIMO | Exploit beam forming SU-MIMO |
| | Up to 8 x 8 | Medium rank | Low rank |
| Antenna Elements | up to 32 / 64 | up to 256 / 256 | up to 256 / 256 |
| Transceiver Design | Digital | Hybrid | Analog |

FIG. 2E

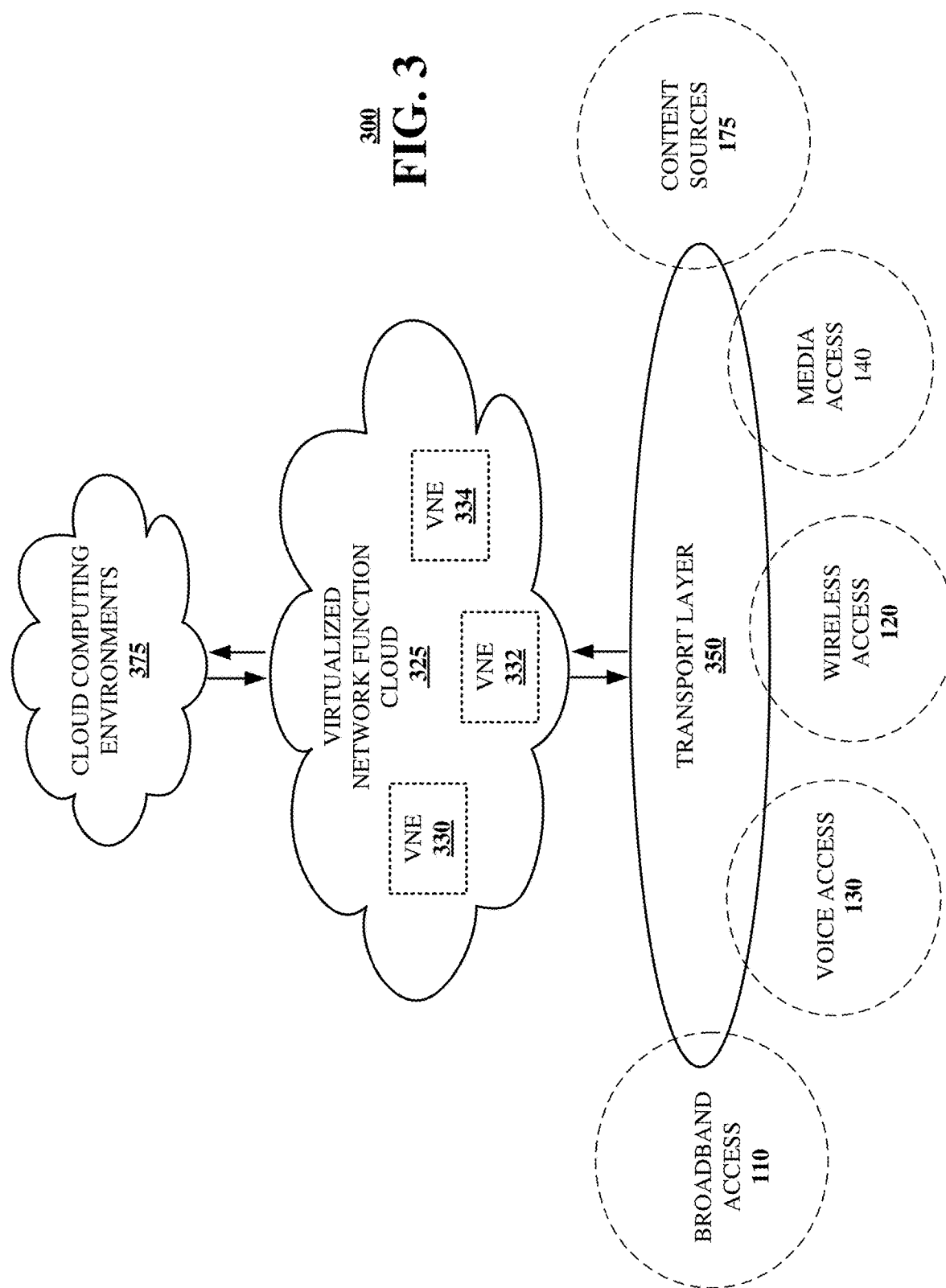

_US 12,550,006 B2_

OPTIMIZED ON DEMAND DYNAMIC USAGE OF DYNAMIC BEAM-FORMATION OF RADIO ACCESS NETWORK

FIELD OF THE DISCLOSURE

The subject disclosure relates to selecting a best spectrum location and beam formation in a radio access network.

BACKGROUND

In a wireless network or radio access network, many parameters affect radio signal strength from a transmitter received at a receiver. This is particularly true when a radio antenna is used to form a beam for communication between transmitter and receiver. Some of these factors include the distance between the transmitter and the receiver; the gain profile of a radio antenna and other components; absorption losses in the environment; scattering in the environment, such as Rayleigh scatter and Mie scattering; a dispersion profile; and characteristics of the air interface. The parameters complicate a process of choosing a best frequency spectrum location and an optimum beam formation for the environment.

BRIEF DESCRIPTION OF THE DRAWINGS

Reference will now be made to the accompanying drawings, which are not necessarily drawn to scale, and wherein:

FIG. 2A is a block diagram illustrating an example, non-limiting embodiment of a system functioning within the communication network of FIG. 1 in accordance with various aspects described herein.

FIG. 2D shows information about supported data rates and modulation formats in an exemplary embodiment of a system functioning within the communication network of FIG. 1.

FIG. 2E shows technical information about supported capabilities in an exemplary embodiment of a system functioning within the communication network of FIG. 1.

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for selecting optimum parameters for launching a new channel in a radio network, including selecting a radio point, selecting bandwidth for the channel and selecting an antenna configuration to obtain beam reachability to a user equipment device from the selected radio point. Information about the radio access network, including network topology, equipment and parameters, is collected and used with a model to select the parameters for launching the new channel. Other embodiments are described in the subject disclosure.

One or more aspects of the subject disclosure include collecting network information for a mobility network, including processing the network information at a central controller serving the mobility network, building, in the central controller, a machine learning model including building the machine learning model using the network information, and allocating, by the central controller, radio channels of the mobility network based on a recommendation of the machine learning model.

One or more aspects of the subject disclosure include establishing a software defined domain (SDD) controller at a network location, receiving, at the SDD controller, network information for a mobility network, and providing at least a portion of the network information to a machine learning model. Aspects of the subject disclosure further include receiving, from the machine learning model, a channel recommendation for the mobility network and launching a channel based on the channel recommendation, wherein launching the channel comprises selecting a radio point of the mobility network and a bandwidth for radio communication by the radio point.

One or more aspects of the subject disclosure include receiving, at a software defined domain (SDD) controller at a network location of a communications network, network information defining topology and communication resources of a mobility network in data communication with the SDD controller, providing at least a portion of the network information to a machine learning model, and receiving, from the machine learning model, a channel recommendation for the mobility network. Additional aspects of the subject disclosure include selecting a selected radio point of the mobility network, a selected bandwidth for a channel to be launched at the selected radio point, and an antenna configuration for the selected radio point and communicating information about the selected bandwidth and the antenna configuration to the selected radio point for launching the channel.

Figure 1:
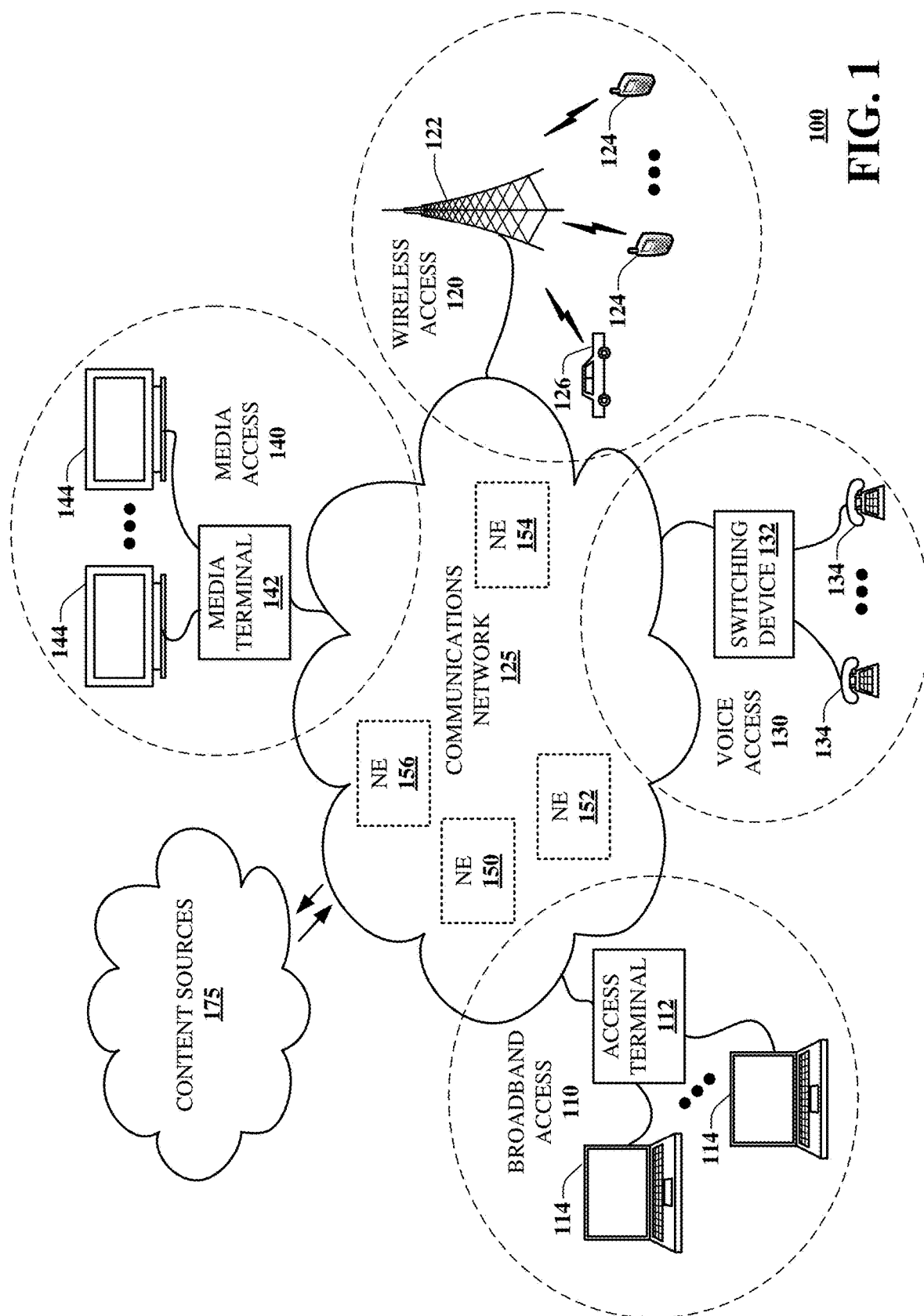
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part selecting optimum parameters for launching a new channel in a radio network, including selecting a radio point, selecting bandwidth for the channel and selecting an antenna configuration to obtain beam reachability to a user equipment device from the selected radio point. Information about the radio access network, including network topology, equipment and parameters, is collected and used with a model to select the parameters for launching the new channel. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system functioning within the communication network of FIG. 1 in accordance with various aspects described herein. In accordance with some embodiments, a system including one or more radio access networks uses beamforming technology to communicate over a radio channel between a base station or eNodeB or gNodeB, such as in a cellular radio system. In such a system, many parameters may affect radio signal strength from a transmitter received at a receiver. Some of these factors include the distance between the transmitter and the receiver; the gain profile of a radio antenna and other components; absorption losses in the environment; scattering in the environment, such as Rayleigh scatter and Mie scattering; a dispersion profile; and characteristics of the air interface. For example, seasonal weather changes between winter and summer can affect characteristics of the air interface, which in turn can affect reachability.

The parameters complicate a process of choosing a best frequency spectrum location and an optimum beam formation for the environment. These parameters can affect launching a new radio channel or can impact an existing radio channel. For example, addition of more high-capacity channels can cause refractive index changes due to non-linearity effects. Added amplification requirements can cause a change in the noise environment.

Moreover, a radio network, including a mobility network, should be able to handle sudden surges in traffic. For example, some services require substantial bandwidth and relatively high quality of service (QoS). These services include, for example, live video streaming, augmented reality (AR) and virtual reality (VR). If a customer with a mobile device desires to stream a 4K or 8K live video, or an augmented reality or virtual reality service, the system needs to assign network resources to the customer for the service including assigning a suitable beam to the mobile device to handle the surge in traffic to the customer location.

Still further, the radio network must be adaptive and flexible to manage peak hour traffic requirements. For example, during particular events, bandwidth demand can be very great. Examples include concerts or festivals such as Diwali or Christmas, where customers are uploading video files or live videos at one or many locations. Other examples include extended events such as World Cup football matches when mobile network traffic and bandwidth requirements may surge for an extended period, or during natural disasters when traffic demand may be high but very localized.

Still further, the radio network must be adaptive to changing traffic requirements throughout a particular day. For example, in some service areas, traffic may be relatively light during the business day but heavy in the evening, as residents are at home downloading content and using the network. Conversely, in a business district, traffic may be relatively high during the day when businesses are open and active but less during the evening and overnight when businesses are relatively quiet. The network should learn these daily variations and respond accordingly by assigning bandwidth and appropriate beam formation at various times of the day and days of the week.

In embodiments, a centrally located, software defined domain controller (SDD) may be used to collect information about these parameters, as well as information about the physical environment and the radio environment and, based on this information, the centrally located SDD may optimize bandwidth and beam formation for channels throughout a network, for example to have maximum reachability. As used herein, "centrally located" means located at one or more devices in data communication with other devices of a network or combination of networks that have available required data for processing by the SDD or may implement the results of the SDD processing. Processing may be distributed over two or more processing systems. However, in embodiments a single instantiation of the SDD controller is used as the centrally located SDD. The information located at the central location can be used to tune beam formation and spectrum assignment and, in that way, select the right or best channel or set of channels for communication with an end device such as a cell phone or other mobile device. In embodiments, a machine learning (ML) model or artificial intelligence (AI) can operate to process the collected information, select an optimum channel or set of channels, optimum channel bandwidth, optimum beam shape, etc., to provide maximum reachability. The current radio network may learn from past experiences when traffic and bandwidth demand varied or surged.

In embodiments, the disclosed apparatus and service may learn physical characteristics of a network and its service area and create a database of information. The information in the database may be analyzed by applications to predict future needs for network resources. For example, a software defined domain controller (SDDC) application can decide if future demands of the network can be met by the current network infrastructure.

FIG. 2A illustrates examples of beam formation and adaptation to current traffic demands. In a first scenario 200A, a fixed wireless radio access point 202 provides mobile communication service to a plurality of user equipment (UE) devices 204. The mobile communication service in examples is fifth generation (5G) cellular service according to the published 3GPP standard. The fixed wireless radio access point 202 provides a first beam 206 and a second beam 208 for service in a coverage area near the fixed wireless radio access point 202. The first beam 206 and the second beam 208 at least partly overlap and have a common service area.

In a second scenario 200B, a wireless radio access point 202B provides a first beam 206 and a second beam 208 and a third beam 210 to provide 5G macro service to UE devices 204. Relative to first scenario 2A, in scenario 2B, traffic has increased in the service are of the wireless access point 202b which responds by forming additional beams using available bandwidth. The adaptation to the changed situation is controlled by a centrally located SDD (not shown) in communication with the wireless radio access point 202B.

In a third scenario 200C, the radio access point 202C provides multiple beams such as first beam 206 and second beam 208 to provide radio service to multiple UE devices 204. Some UE devices 204 are located in high-rise buildings, indicating a three-dimensional service area. In addition, many UE devices such as UE device 204 are located and mobile on the ground in the two-dimensional service area. This illustrates a surge in communication demand indicated by the presence of many UE devices such as UE device 204 in the service area of the radio access point 202C. The radio access point 202C, under control of a remotely located SDD, responds to the increased traffic demand by greatly increasing the number of beams formed, such as first beam 206 and second beam 208. Bandwidth is controlled and distributed among the UE devices 204. Each of scenario 200A, scenario 200B and scenario 200C may be handled by a centrally located SDD controller that collects historical and real-time network information and controls beam formation and bandwidth usage.

Current networks do not have the capacity or capability to learn the relevant characteristics of the entire radio access network, and do not have the ability to resolve existing problems in the network, such as responding to a surge in traffic demand. Further, current networks do not have software defined domain controllers (SDDC) applications to collect parameters at run time and to use that data to learn characteristics of the access network. This learning may help make intelligent decisions while adding dynamic beam formation of new channels and spectrum during run time.

In embodiments, a system and apparatus for on-demand dynamic usage of dynamic beam-formation in radio access network may include a software defined domain controller (SDDC) and a training and test module. The SDDC and the training and test module may be located in any suitable network location, such as in the core network of a mobility network provider or in the cloud network of the mobility network provider. The SDDC and the training and test module may communicate and exchange data with other network elements including base stations of the mobility network which may be referred to as an eNodeB or eNB or a gNodeB or gNB. The SDDC in embodiments may include a topology manager and an artificial intelligence and machine learning (AI/ML) system. The system and apparatus operate to collect data from the network about network connection and operation. The data are used to train or build the training and test module. The training and test module may operate to predict or recommend beam formation for eNB or gNB devices of the network. The process of radio beam formation may flexible modulation formats, adaptive forward error correction (FEC), control over a coherent multiple input, multiple output (MIMO) receiver, flexible data rates, flexible data types, etc. In embodiments, the radio beam formation process may tune or select a channel for radio communications, select a bandwidth and optimize reachability. The process can be used for launching a new beam for a new connection to a UE device or for modifying a current beam based, for example, on updated information.

Figure 2B:
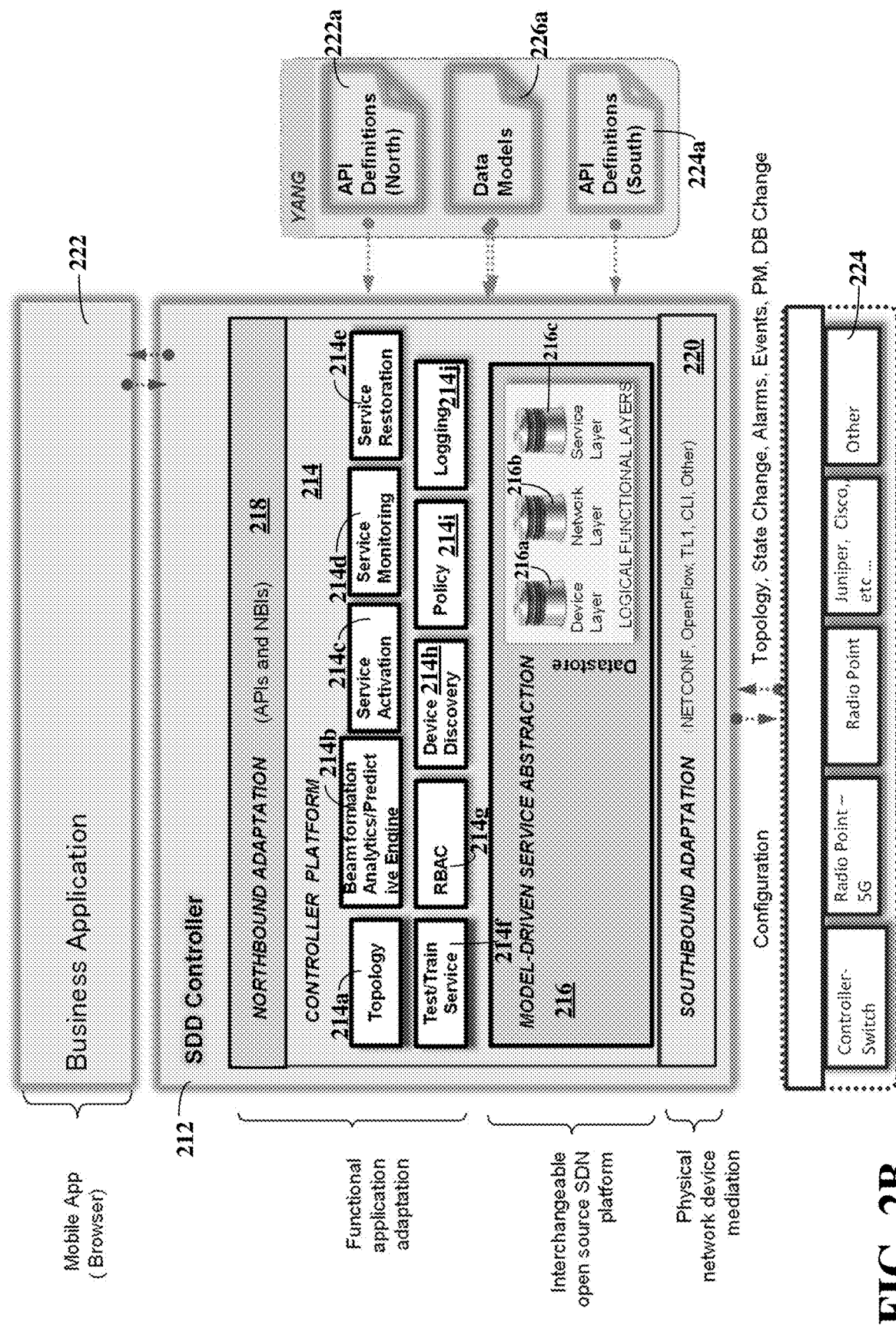
FIG. 2B is a block diagram illustrating an example, non-limiting embodiment of a software defined domain controller in accordance with various aspects described herein.

FIG. 2B is a block diagram illustrating an example, non-limiting embodiment of a software defined domain controller 200 in accordance with various aspects described herein. The software defined domain controller (SDDC) 212 may be used to collect information about network configuration and components and activity in a mobility network, and to control assignment of bandwidth, channels and beamforming in the mobility network. In the example, the SDDC 212 includes a controller module 214, a model driven service abstraction module 216, a northbound adaptation module 218 and a southbound adaptation module 220. The SDDC 212 may be implemented in any suitable fashion including hardware components and software elements. The SDDC 212 may be located in any suitable location accessible to the network, such as in a core network of the mobility network or in a cloud network operated by an operator of the mobility network.

The controller module 214 performs many of the functions of the SDDC 212. The controller module 214 in the illustrated embodiment includes a topology module 214a, a beam formation module 214b, a service activation module 214c, a service monitoring module 214d, a service restoration module 214e, a testing and training module 214f, a role-based access control (RBAC) module 214g, a device discovery module 214h, a policy module 214i, a logging module 214j. In other embodiments, the controller module may include more, fewer or alternative functions, and the functions may be combined or separated in other manners, depending on design requirements.

The topology module 214a collects and stores information about the topology of the mobility network. Such information may include identification information for cell sites including eNB and gNB devices, capability information about the devices at each location, and so forth. Moreover, as the network topology changes, the topology module 214a collects updated information about changes to the network topology including information about devices added to the network, devices removed from the network and devices temporarily offline, such as for maintenance. The information about network topology may be written to or provided to the topology module 214a by other network elements or the information may be actively collected by the operation of the topology module 214a. The information stored by the topology module may be used to select and assign network resources such as bandwidth and beams to UE devices in the mobility network.

The beam formation module 214b includes an analytic section and a prediction engine. The analytic section receives information, such as the network topology information stored by the topology module 214a and information about UE devices active in the mobility network. The analytic section may receive current information including real-time network information and historical information. The analytic section provides information to the prediction engine. The prediction engine may include a machine learning model or artificial intelligence and operates to make decisions about bandwidth assignment and beam formation for network devices such as eNB devices or gNB devices at cell sites of the mobility network that are engaged in radio communication with UE devices.

The service activation module 214c maintains and monitors information about devices placed in service or removed from service in the mobility network. In embodiments, this includes UE devices or network infrastructure devices such as eNB or gNB devices, or a combination of these. The service monitoring module 214d operates to monitor active service to devices of the mobility network. Similarly, the service restoration module is involved in restoring service to a device that has been removed from the mobility network for any reason.

The testing and training module 214f may store and provide information for testing functionality in the SDDC 212 including training a machine learning model of the beam formation module 214b. The RBAC module 214g controls access to network facilities based on an individual's status or other associated information. The device discovery module 214h operates to locate and identify and collect information about devices active in the mobility network, including devices new added to the network. Such information may be shared with, for example, the topology module 214a or the service activation module 214c. The policy module 214i stores information about network policies and rules, such rules for assigning bandwidth in particular situations and circumstances. The logging module 214j may track and store information about operations of the controller module, SDDC 212, for later reference. The stored information may be organized in any suitable manner, including indexing, to simplify operations of storage and recall and to reduce storage requirements.

The model driven service abstraction module 216 in embodiments includes a software defined network (SDN) which implements the services of the controller module 214. The model driven service abstraction module 216 may be implemented, for example, as a set of network slices or nodes and may include or access a set of databases, including, in the illustrated embodiment, a device layer datastore 216a, a network layer datastore 216b and a service layer datastore 216c.

The northbound adaptation module 218 and the southbound adaptation module 220 provide data communication facilities for interaction by the SDDC 212 with other devices. The northbound adaptation module 218 in the illustrated embodiment includes an application programming interface (API) or a northbound interface (NBI). A northbound interface is an interface that allows the SDDC 212 to communicate with a higher-level component, such as business applications 222 that may be embodied as a browser or other application operating on a mobile device. The northbound adaptation module 218 may access API definitions 222a. The southbound adaptation module 220 may include communication protocols such as NETCONF, OpenFlow, TL1 or CLI. NETCONF is a protocol enabling installation, manipulation, and deletion of the configuration of network devices. OpenFlow is a network protocol that facilitates direct communication between network systems via Ethernet. Transaction Language 1, or TL1, is a management protocol for managing broadband and optical network infrastructure. Command-line interface is an interface that allows command and control of a network device such as a network router. The southbound adaptation module 220 may access API definitions 224a. The southbound adaptation module 220 may provide data communication and access to other equipment and applications 224 of the mobility network such as 5G radio points. For example, the SDDC 212 may obtain the information necessary for model building through the southbound adaptation module 220. Further, the southbound adaptation module 220 may obtain data models 226a from data storage.

Figure 2C:
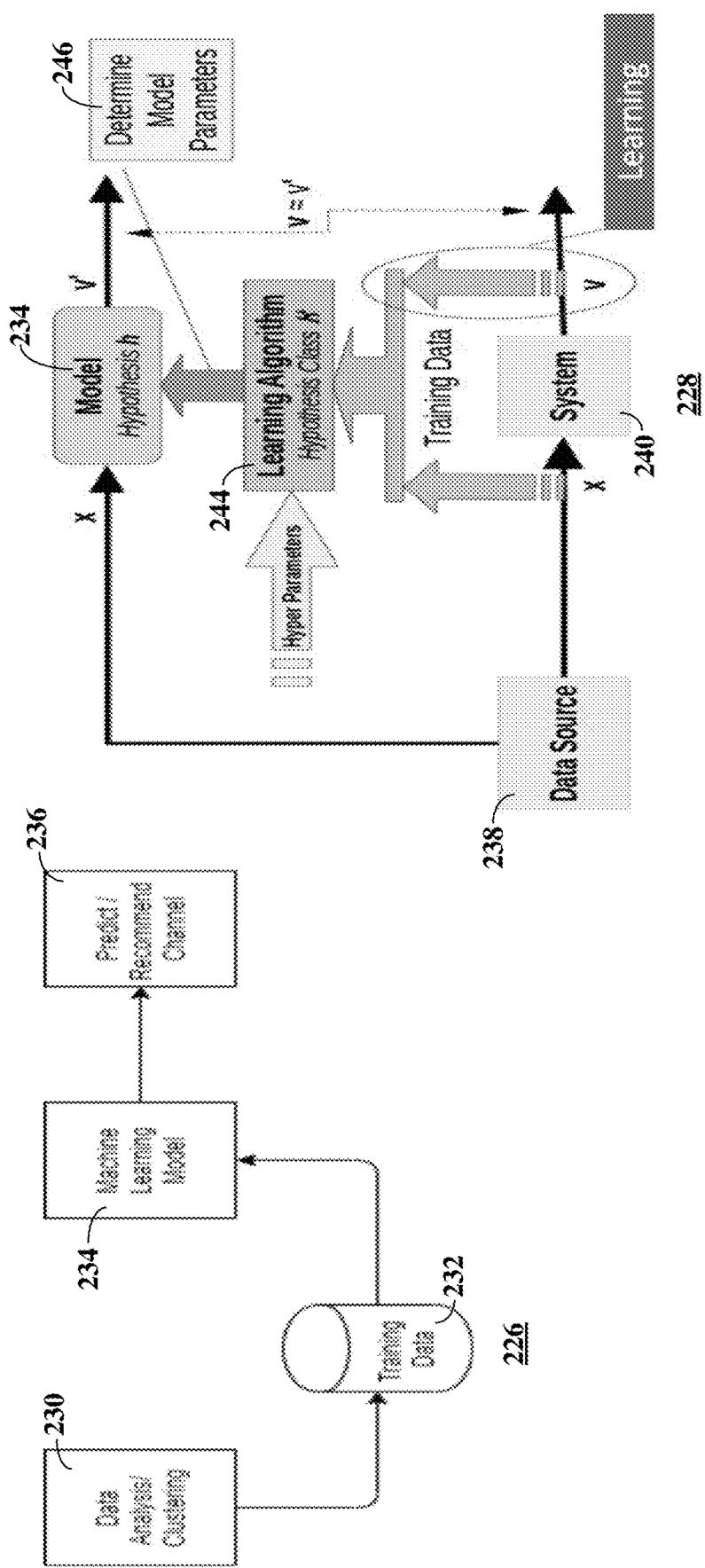
FIG. 2C shows embodiments of systems for developing a model for beam formation in a mobility network in accordance with various aspects described herein.

FIG. 2C shows embodiments of a first system 226 and a second system 228 for developing a model for beam formation in a mobility network in accordance with various aspects described herein. First system 226 includes a data analysis module 230, a training data repository 232, a machine leaning model (MLM) 234 and a prediction module 236. The data analysis module 230 receives information about a mobility network including information about network elements, their location, network topology, and other information. Further the data analysis module 230 receives information about network operation, including devices active in the network, available resources such as bandwidth and frequency channels, and network activities like UE devices registering with the network, UE device handovers, etc. The data analysis module processes and analyzes the received data. For example, clusters of data may be found and identified. The analyzed data is stored in the training data repository 232. Further, the analyzed data is used to train the MLM 234. The MLM 234 may include any suitable machine learning model, such as a random forest model, a K Means clustering algorithm, a linear regression algorithm, an artificial neural network, a K nearest neighbors algorithm, or a recurrent neural network (RNN), an artificial neural network (ANN) or a convolutional neural network (CNN) model. Current data from the mobility network may be provided to the MLM 234 to develop a prediction or estimate for a beam formation solution for a particular downlink in the mobility network. The prediction module 236 uses the output from the MLM 234 to recommend channel parameters to the network. Such recommended channel parameters may include an eNB or gNB for communication with a particular UE device, beam formation parameters, channel selection and bandwidth, and others.

The second system 228 may be used to develop the model 234 used in the first system 226. The second system 228 includes a data source 238, a system 240 which may be the mobility network or one or more components of the mobility network, and a model 234. The second system 228 further includes a learning algorithm 244 and a model parameter determination module 246. The data source 238 provides data about the mobility network including operating and functional information for the mobility network. The data are provided to the system 240. Training data are collected from the system 240, including training provided as an input to the model 234, labelled X in FIG. 2C and training data received as an output from the system 240 and labelled V in FIG. 2C.

The training data X, V are provided to a learning algorithm 244. The learning algorithm 244 further receives hyperparameters which are specified by a user and used to help tune the learning algorithm 244. The values of the hyperparameters control the learning process of the learning algorithm and determine the values of model parameters that the learning algorithm ends up learning. For example, the hyperparameters may identify a type of centroid to be found in the data for clustering or identify how many clusters are to be found or, for a deep learning recurrent neural network (RNN) model, the hyperparameters may specify how many layers the neural network may have.

The learning algorithm 244 generates the model 234 which performs hypothesis testing of a hypothesis labelled h in FIG. 2C. Test data is provided to the model 234 and produces a test output V'. The same test data is provided to the system 240 and produces output V, corresponding to an expected output. In embodiments, V and V' may be vectors of data values. A comparison is performed on the system output data V and the model output vector V', i.e., V≈V'. If the values are suitably close, such as within a tolerance value specified by a hyperparameter, then they model 234 is considered fully trained and may be used for production purposes. For example, if the model has ninety percent accuracy, meaning that for 100 input records, the model output matches the expected output within a tolerance value such as five percent, the model 234 may be considered ready for production. The ten percent or input records that are failures may be considered to be scenarios which are exceptions.

The model 234 selected by process of the second system 228 may not handle well all scenarios in the mobility network. For example, a RNN model may work well for routine traffic at a first network node but produce failures when the scenario of a call handover from the network node to a second network node. The second system 228 permits different models to be tried and evaluated, offline but using historical data from the data source 238. When a more accurate model 234 is identified that better handles all scenarios, or some scenarios, that model may be moved to production in the first system 226.

FIG. 2D shows information about supported data rates and modulation formats in an exemplary embodiment of a system functioning within the communication network of FIG. 1. The information in FIG. 2D illustrates examples of data needed by a system for dynamic beam formation. In particular, to determine factors such as bandwidth, frequency, beam shape, etc., the system requires information about supported data rate and supported modulation formats. The information in FIG. 2D may be considered provisioning parameters for the system for dynamic beam formation at a radio point. Supported data rates are rates of transmission, in Mbps, that the mobility network, or a portion of the mobility network under consideration, must be able to provide. Supported modulation formats are the types of radio frequency modulation that the mobility network, or a portion of the mobility network under consideration, must be able to provide. Examples include orthogonal frequency division modulation (OFDM), quadrature amplitude modulation (QAM), quadrature phase shift keying (QPSK). Not all networks or portions of networks such as eNB devices and gNB devices, will support all data rates and all modulation formats. Modulation format is an important input because it can affect reachability of the beam that is formed. Reachability may refer to the distance a beam can travel from transmitter to receiver, or the distance at which a beam can be reliably received by a receiving remote from the transmitter. In typical embodiments, the transmitter of the beam is a 5G base station include an eNB or gNB and the receiver is a UE device, either fixed or mobile. For example, selecting a higher data rate 64 QAM instead of lower data rate 16 QAM has the effect of reducing reachability. When dynamically forming a beam, the requirements of the beam such as reachability and data rate must be balanced, in line with the available technology at a particular eNB or gNB.

Further, the system for dynamic beam formation may receive as provisioning parameters information about supported forward error correction (FEC) schemes. Examples include standard FEC, enhanced FEC, and adaptive FEC. Further, adaptive FEC may be available in variations with overhead ranging from 0 bytes up to one-half the number of payloads.

Other information the system for dynamic beam formation may receive includes information about available spectrum, such as the 5G indoor and outdoor millimeter wave spectrum. Spectrum is licensed and may be available in discontinuous bands. Available spectrum may be included in provisioning parameters.

Other information may be relevant and may be collected and form provisioning parameters. For example, if an eNB uses fourth generation cellular (4G LTE) for communication, the LTE may have 4 or 8 antennas available that may be used for beam formation. However, 5G implementations may use 256 or 512 antennas for beam formation and may provide a more flexible beam formation solution.

In embodiments, the system for dynamic beam formation may use the information available about the mobility network to calculate several parameters for a radio point. The calculations should be based on different combinations of the provisioning parameters, including those shown in FIG. 2D. In embodiments, calculations may include spectral efficiency, asymptotic power efficiency, average energy, and attenuation.

In some embodiments, maximum reachability is one important design goal. If different modulation techniques are available, power efficiency for each modulation technique can play in an important role in selecting a modulation technique and forming a beam. Accordingly power efficiency and spectral efficiency should be evaluated. Spectral efficiency should be calculated for all the combinations of modulation formats with bandwidth. For example, spectral efficiency or SE, may be calculated as, $SE = \text{Log}_2(M) \div (N/2)$, where $M$ is no of symbols and $N$ dimensionality.

Asymptotic power efficiency, or AFE may be calculated as, $APE = \text{gama} = d^2_{min}/4E_b = d^2_{min} \log_2(M)/4E_s$ where average symbol rate E is calculated as, $$E_s = \frac{1}{M} \sum_{k=1}^{M} \|c_k\|^2.$$

Average energy per bit is $AE_b = E_s/\text{Log}_2(M)$.

Attenuation is $$\alpha_{db} * L = 10 \log_{10} \frac{Pi}{Po},$$

where $\alpha_{db}$, or signal attenuation per unit length in decibel and L is optical length. Pi is launch power and Po is received power.

A further provisioning parameter in some embodiments is Advanced Antenna Unit (AAU) gain. This may be estimated based on a vendor's effective isotropic radiated power (EiRP).

FIG. 2E shows technical information about supported capabilities in an exemplary embodiment of a system functioning within the communication network of FIG. 1. The information in FIG. 2E shows, for three different configurations of a 5G radio system, available resources. For example, for a 5G macrocell, assigned spectrum is in a range less than 6 GHz and bandwidth is in an approximate range of 5 to 100 MHz. Further, for the 5G macrocell, frequency division duplexing/time division duplexing (FDD/TDD) may be used and mobility is relatively high. Other network parameters are specified for the 5G macrocell design as well as for the 5G small cell or microcell network and a 5G fixed wireless cell.

The table of capabilities of FIG. 2E thus represents a set of tradeoffs or design conditions. A 5G macrocell can have high mobility for UE devices in the cell, but the bandwidth is limited to 5-100 MHz in this example. A rich multipath environment and high spectral efficiency allows spatial multiplexing and use of single user and multiple user multiple input, multiple output (SU and MU MIMO) technology. In the case of a 5G microcell radio point, usable spectrum is in the range of 3-30 GHz and available bandwidth is 5-400 MHz, but with low mobility for UE devices. With low spectral efficiency, the 5G microcell can exploit beamforming, SU- and MU-MIMO. On the other hand, a 5G fixed wireless cell can offer up to 2000 MHz bandwidth but mobility is not an options. The user equipment must be generally stationary. With few propagation paths and low spectral efficiency the 5G fixed cell can exploit beamforming and SU-MIMO. However, few if any UE devices require 2000 MHz of bandwidth. In the case of the 5G fixed wireless cell, one option may be to provide the beam to a radio point which is turn connects to multiple mobile devices at a location such as a shopping mall or at an event with large attendance such as the Olympic games or a football match.

The information illustrated in FIG. 2E can be collected by the system for dynamic beam formation. This information can be used to help tune and refine models including a machine learning model for use in beam formation.

Figure 2F:
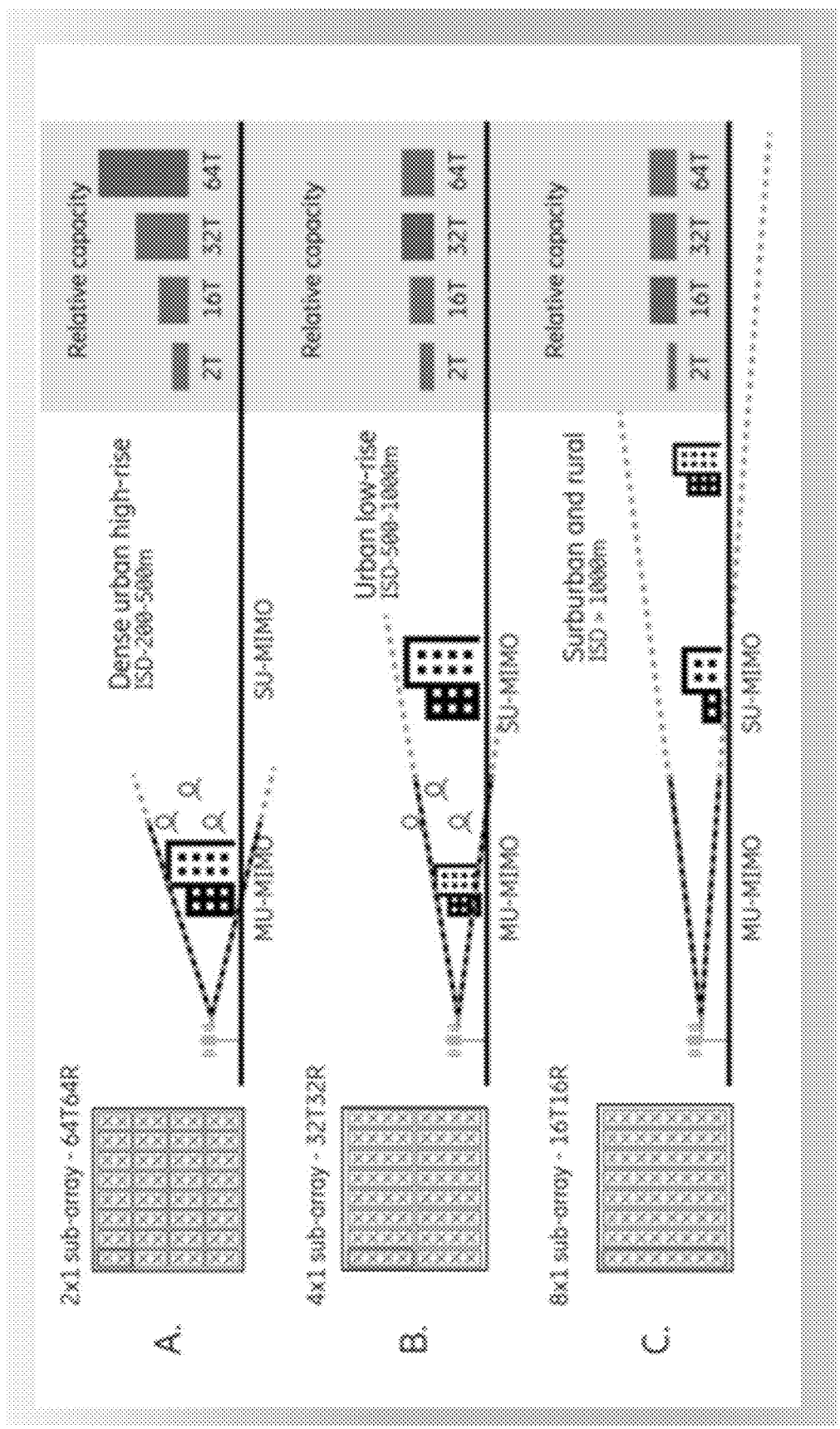
FIG. 2F is a diagram illustrating possible beamforming arrangements in different environments of a radio access network in accordance with various aspects described herein.

FIG. 2F is a diagram illustrating possible beamforming arrangements in different deployment scenarios of a radio access network in accordance with various aspects described herein. The scenarios illustrated in FIG. 2F are intended to be illustrative example only.

The first scenario, labelled A in FIG. 2F, illustrates a dense, urban high-rise scenario with many closely-spaced buildings in the environment. Inter-site distances (ISD), or the distance from one cell site with an eNB or gNB to an adjacent cell site, are relatively short, on the order of 200-500 meters. A beam may be formed by an antenna array which includes rows and columns of respective antenna elements. The antenna elements are independently driven to drive and steer a beam. The antenna array may be divided into sub-arrays of antenna elements. For the 2×1 sub-array of the first scenario, the antenna array provides relatively broad coverage but the reachability is poor. However, as indicated in the drawing figures, MU-MIMO is an option for the radio network and relative capacity is high.

The second scenario, labelled B in FIG. 2F, illustrates an urban low-rise scenario, with closely-spaced low rise buildings in the environment. In the illustrated example, ISD is typically 200-500 m. In the example, a 4×1 sub-array of antenna elements is used and the resulting beam has greater reachability with reduced capacity relative to the first scenario. MU-MIMO and SU-MIMO are both options in the second scenario.

The third scenario, labelled C in FIG. 2F, illustrates a suburban or rural arrangement for a radio network. Using an 8×1 sub-array, capacity is relatively small compared with the first scenario and the second scenario. However, where typical ISD is 1000 m or more, reachability for the third scenario is greater than reachability for the first scenario or the second scenario.

In accordance with embodiments, then a beam may be selected or formed based on a variety of inputs. FIG. 2F illustrates that the inputs may include information about the radio environment, such dense urban, low-rise urban, suburban or rural, as well as requirements such as reachability and capacity. A controller, such as the SDD controller 212 of FIG. 2B, may process the received information to control beam formation for the mobility network.

In addition to factors already discussed, path loss may be a significant issue in reliable radio communication. Path loss is the loss of power of a radio frequency (RF) signal travelling or propagating through space. Path loss is typically expressed in units of dB. Path loss depends on the distance between the transmitting antenna and the receiving antenna. Path loss is proportional to the square of the wavelength of the carrier wave.

However, at frequencies of interest, such as millimeter wave frequencies, the path loss is such that the radio beam cannot penetrate a wall or other objects. At the receiver, the same size of receive aperture captures the same amount of received power from an isotropic antenna, regardless of frequency. An isotropic antenna radiates equally in all directions so that the power is constant on the surface of a sphere spaced from the antenna. For example, an RF signal at 2.8 GHz produces the same size receive aperture as an RF signal at 28 GHz.

However, if array antennas are used for transmission and reception, the transmit power can be directed toward the receive antenna. The received power can be higher at higher frequencies with array antennas. When forming a beam for transmission, goals may include keeping received power substantially the same for all frequencies of interest and avoiding a power drop in the uplink and the downlink.

In embodiments, information about path loss can be computed and stored in a database for subsequent use. For example, the Third Generation Partnership Project (3GPP) publishes one or more standards which define path loss and related quantities of interest. Using 3GPP resources and others, a knowledge base of path loss information can be stored for subsequent accessing when dynamically defining a beam in a radio network.

Figure 2G:
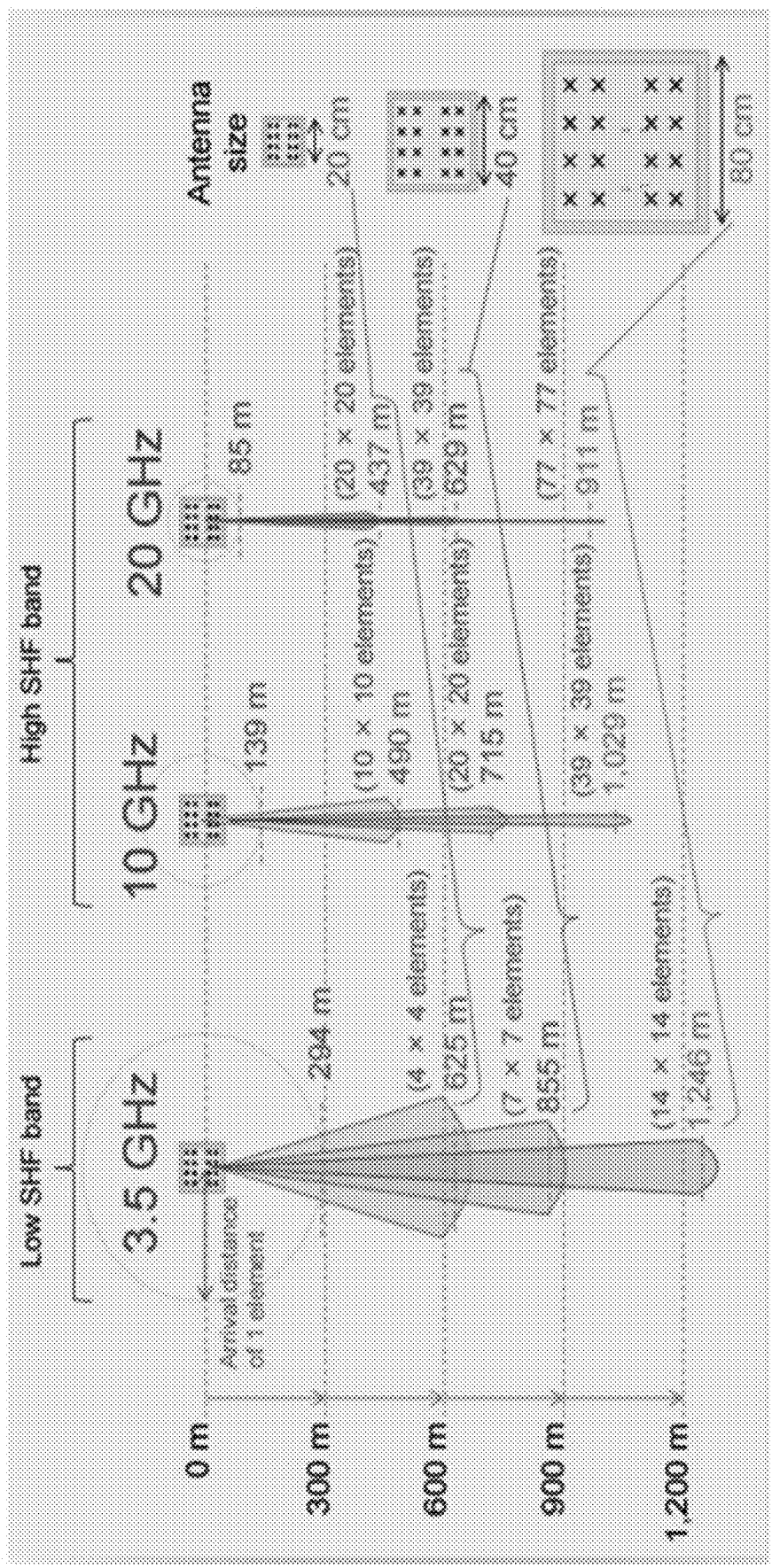
FIG. 2G illustrates graphically relationships between transmission frequencies, number of antenna elements and reachability in a radio communication system.

FIG. 2G illustrates graphically relationships between transmission frequencies, number of antenna elements and reachability in a radio communication system. The illustrated example uses the super-high frequency (SHF) band from 3 to 30 GHz. In one example, at 3.5 GHz transmission frequency, the arrival distance or reachability of a 1 element antenna is approximately 294 m. At the same frequency for an antenna array of 4×4 elements, the arrival distance is approximately 625 m. For an array of 14×14 antenna elements, the arrival distance is approximately 1246 m. At a transmission frequency of 10 GHz, for a single element antenna, the arrival distance is approximately 490 m and for a 39×39 element antenna array, the arrival distance is approximately 1029 m. At 20 GHz transmission frequency, a single element antenna has an arrival distance of approximately 437 m and a 77×77 element antenna has an arrival distance or reachability of 911 m. Antenna gain may be determined as $10 \log_{10}(M)$, where M is the number of antenna elements. If relatively few antenna elements are used, the transmission pattern will show relatively large side lobes as the beam is not well-focused. On the other hand, more antenna elements correspond to a more focused beam and greater reachability.

Thus, with decreasing wavelength or increasing frequency, the number of antenna elements should be increased. A lower transmit power, such as 2 watts, may be used at different frequencies. FIG. 2G illustrates some tradeoffs that may be made in beam formation.

Accordingly, information about the physical environment, the radio environment and available equipment can be collected at a central location in a controller or other device. The controller can determine, for a particular scenario, what will be the optimal beam formation, what frequencies and bandwidth should be used, which channel should be launched, etc. This can be determined for specific use cases, including based on the vendor of particular radio equipment being used. Each vendor may have different specifications and awareness of the make and model of an eNB or gNB or antenna may be further used as inputs to an algorithm to define a beam from the eNB or gNB to a subscriber.

To perform the necessary analysis of environment and equipment can take a substantial amount of time. First, the analysis of must be performed then any changes must be applied, for example, to change a beam definition because of a change in the network. Moreover, for many cell sites, the volume of traffic and number of devices active in a cell can be very large and can change quickly. Accordingly, the necessary analysis must be done automatically and even using machine learning to effectively apply the process substantially in real time. The system and method must determine which bandwidth of beam formation will allow suitable reachability and determine which channels are the best fit for a given scenario. The spectral frequencies may vary on the air interface characteristic. Based on given characteristic, the system must determine what are the best beam formation and the best channel to launch that will have maximum reachability and will cover optimum areas. In embodiments, these determinations are made at a central location of the network where the necessary input information may be gathered, stored and updated.

Other aspects of a radio transmission from an eNB or a gNB may be determined at the central location, as well. For example, the 3GPP specification defines a transport block size (TBS) for a transport block. The transport block is the data provided to the transport layer to be encoded for transmission to a receiver. In examples, the TBS may depend on factors such as the modulation and coding scheme (MCS) and the number of assigned resource blocks and may use predetermined lookup tables. The process may be performed according to the procedure specified by Physical Layer Procedures for Data, 3GPP TS 38.214, for example.

Figure 2H:
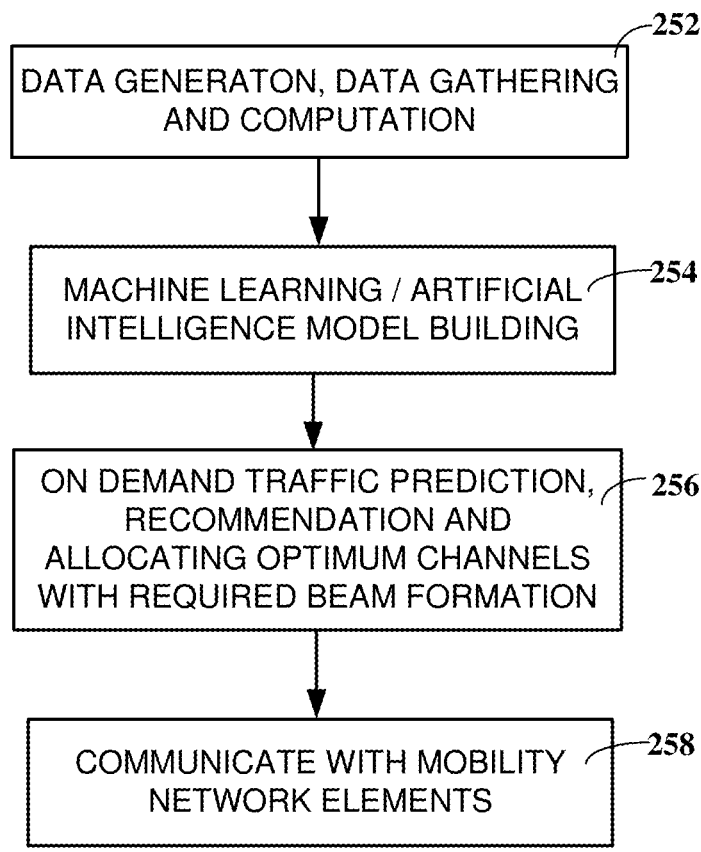
FIG. 2H, FIG. 2I, FIG. 2J and FIG. 2K depict illustrative embodiments of a method in accordance with various aspects described herein.

FIG. 2H, FIG. 2I, FIG. 2J and FIG. 2K depict illustrative embodiments of a method in accordance with various aspects described herein. FIG. 2H illustrates a method 250 for on-demand dynamic channel allocation and beam formation. The method 250 may in embodiments be performed at a centralized location in a network for controlling one or more components of a mobility network. For example, the mobility network may include a group of base stations providing mobile radio service to user equipment (UE) devices in a geographical area served by each base station. Each base station may include one or more eNB or gNB devices providing 5G cellular service and other communication services to the geographical area. The mobility network devices may be in data communication with other networks and network devices including a core network for providing various services. In embodiments, the core network includes a plurality of servers and routers for controlling communications and data in the core network and the mobility network. In an exemplary embodiment, the method 250 may be performed at one or more servers of the core network supporting the mobility network. In other exemplary events, the method 250 may be performed in part or in full using a centrally located, software defined domain controller (SDD).

The method 250 includes a first step 252 of data generation, data gathering and data computation. An embodiment of step 252 is discussed in greater detail in connection with FIG. 2I. During step 252, method 250 collects relevant information about the mobility network including its configuration, information about supported modulation formats and data rates, information about different deployment scenarios, and information about the physical environment of network devices such as base station.

At step 254, the method includes an operation of building a machine learning model or artificial intelligence model for further analysis and decision-making about channel allocation, beamforming and other operations. Any suitable model may be built and trained with appropriate training data, as necessary. An embodiment of step 254 is discussed in greater detail in connection with FIG. 2I.

At step 256, the model of step 254 is used to perform on-demand prediction of radio requirements and to make recommendations and allocations suitable for radio traffic in the mobility network. For example, for a downlink between a particular eNB or gNB and a UE device, step 256 may include selecting an appropriate modulation format and data rate, selecting an appropriate channel and bandwidth, selecting an appropriate antenna configuration for beam formation and selecting an appropriate transport block size for the downlink. An embodiment of step 256 is discussed in greater detail in connection with FIG. 2J.

Step 258 may include a process of communicating the results of step 256 to one or more network elements. For example, downlink information may be communicated to the gNB that is in communication with the UE device, or to two gNB devices engaged in a handover operation with the UE device.

Figure 2I:
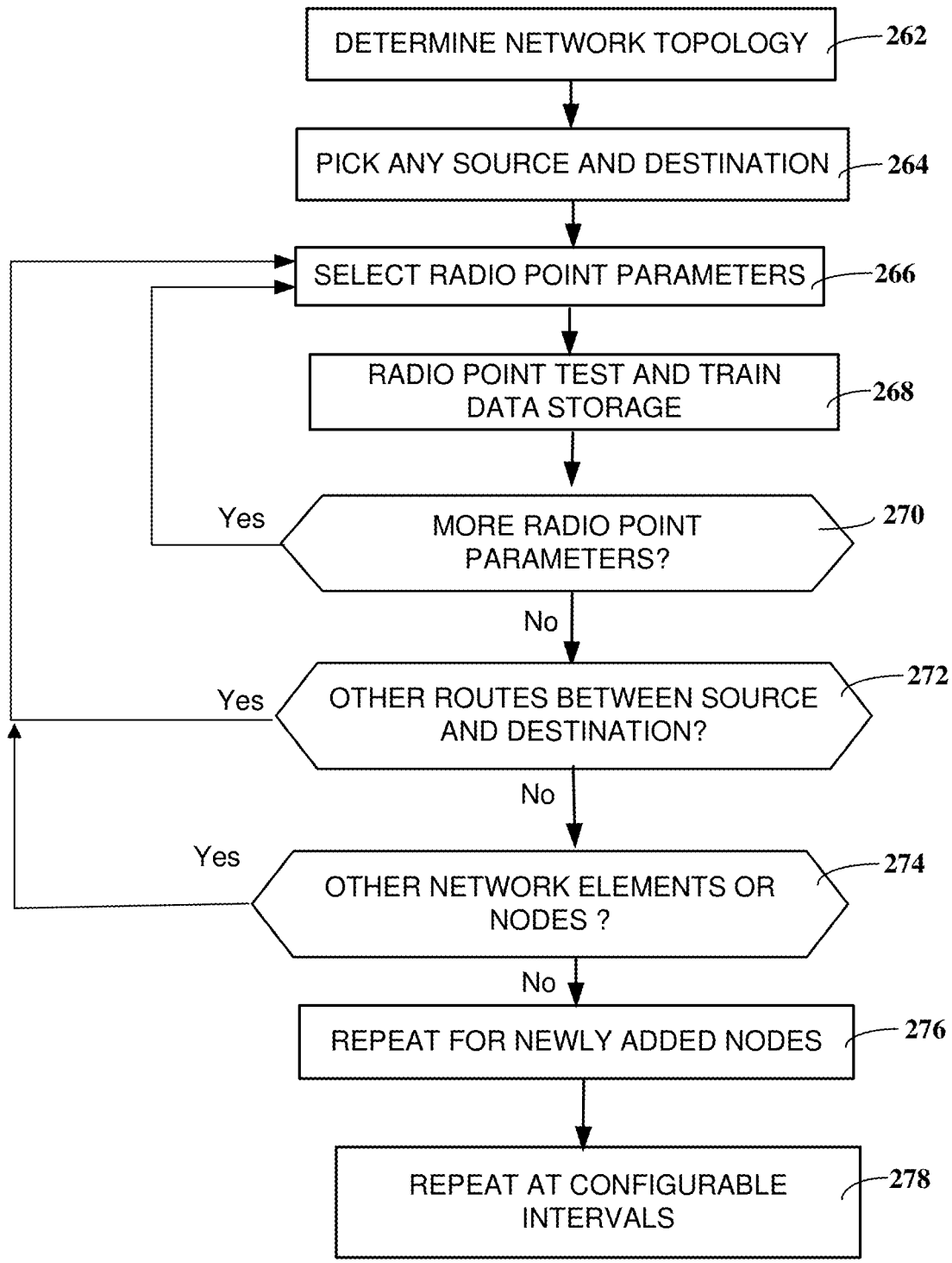

Referring now to FIG. 2I, it shows an exemplary embodiment of a method 260 for generating data, gathering data and computation in anticipation of on-demand dynamic channel allocation and beam formation in a mobility network. The steps of the method 260 may be performed at a centralized location in a network of a network operator. For example, the steps of the method 260 may be performed at a SDD controller designated for the purpose. The SDD controller may be in data communication with other elements of the network such as components of the core network and the radio access network and edge nodes of a cloud network.

At step 262, the method 260 includes determination of network topology. In embodiments, the SDD controller which performs steps of the method 260 may include a topology manager and a topology engine. The topology engine may be designated to determine network topology. Network topology refers to how nodes, devices and connections in a network are physically and logically arranged in relation to each other. Physical network topology refers to physical connections between nodes and the network, including wires, cables and wireless connections over which data may be conveyed. Logical network topology refers to a conceptual understanding of how and why the network is arranged the way it is, and how data moves through the network.

The topology engine may operate in any suitable manner to determine topology of the network. For example, the topology engine may communicate with network elements to identify what network elements are present in the network and how they are interconnected. In embodiments, an initial or baseline understanding of network topology may be developed and subsequently updated as changes are made. For example, network elements may be taken offline for maintenance or other reasons, networks may be expanded with new elements provided, or new networks or subnetworks may be added. The topology engine of the SDD controller may provide information about the network topology to the topology manager. The topology manager will then have a current network view which may be updated as necessary to reflect changes to the network.

After the network topology is learned, a test and trace service procedure may be conducted. In embodiments, nodes which do not use transport layer security (TLS) may be omitted for this process. TLS is a security protocol which facilitates privacy and security for data communication. In an embodiment, at step 264, any route in the network is selected and any suitable source node or network element (NE) may be selected along with any suitable destination node or NE. The destination node may be a next hop in the network, for example. If the selected node is a radio point such as a radio device that transmits and receives information according to an air interface standard, the radio point will have a set of parameters that control and define its operation.

A particular set of parameters may be selected, step 266, and applied to the radio point. At step 268, a radio point test and train process may be conducted to identify and learn aspects of the radio points capabilities and limitations. For example, the radio point's frequency capabilities may be identified. Such frequency capabilities may be defined in part by the manufacturer and model of the radio point and such information may be available from information provided by a vendor of the radio point. Such frequency capabilities may be defined in part by the physical environment of the radio point, such as adjacent structures or terrain which absorb or block some available frequencies of the radio spectrum available to the radio point. Other parameters may be tested as well, and data collected about the other parameters. The process of step 268 may include test communications between the selected radio point and other adjacent or nearby radio points in the network. For example, a test transmission by the radio point may be initiated by the SDD controller as part of step 268 and information about reception of that test transmission may be received from an adjacent source such as another radio point. In some embodiments, UE devices active in the network may be accessed to collect information about parameters for the radio point. For example, after the SDD controller learns how many antenna elements are available at the radio point (FIG. 2F and FIG. 2G), the SDD controller may initiate test transmissions using various combinations of the antenna elements to determine beamforming ability and beam reachability for the radio point. Information about the radio parameters and performance and capabilities of the radio may be stored by the SDD controller in step 268. Such information may be stored in any suitable location in the network and may be subsequently updated by the SDD controller.

At step 270, the method 260 includes a determination if there are more radio point parameters to be tested. In embodiments, the method 260 may run in a loop including step 266, step 268 and step 270, identifying, testing and training all parameters of interest of the radio point of interest. Any suitable set or subset of radio point parameters may be identified, quantified and stored.

At step 272, the method 260 determines if there are other routes between the source and the destination selected at step 264. If so, the additional routes may be tested and additional data collected for the additional routes. The method 260 may continue operating in the loop including step 266, step 268, step 270 and step 272 until all routes in the network are characterized for performance parameters of interest, and the characterization data is stored for subsequent use.

At step 274, the method 260 determines if there are addition network elements or nodes in the network. If so, control returns to step 266 to select parameters for the node or element, such another radio point or a router in the network. The method 260 may continue operating in the loop including step 266, step 268, step 270, step 272 and step 274 until all nodes in the network are characterized for performance parameters of interest, and the characterization data is stored for subsequent use.

At step 276, the method 260, if a new node is added to the network, some or all of the process of method 260 may be repeated for the new node to collect, characterize and store information about the new node. Similarly, the process of method 260, in all or in part, may be repeated at intervals to ensure that the characterizing information is up to date for the network. The repeat interval may be periodic such as daily or weekly, or it may be user selectable or variable based on particular information. Some network portions that receive more traffic or that are varied more frequently may be updated at faster intervals than other, more static network portions.

Figure 2J:
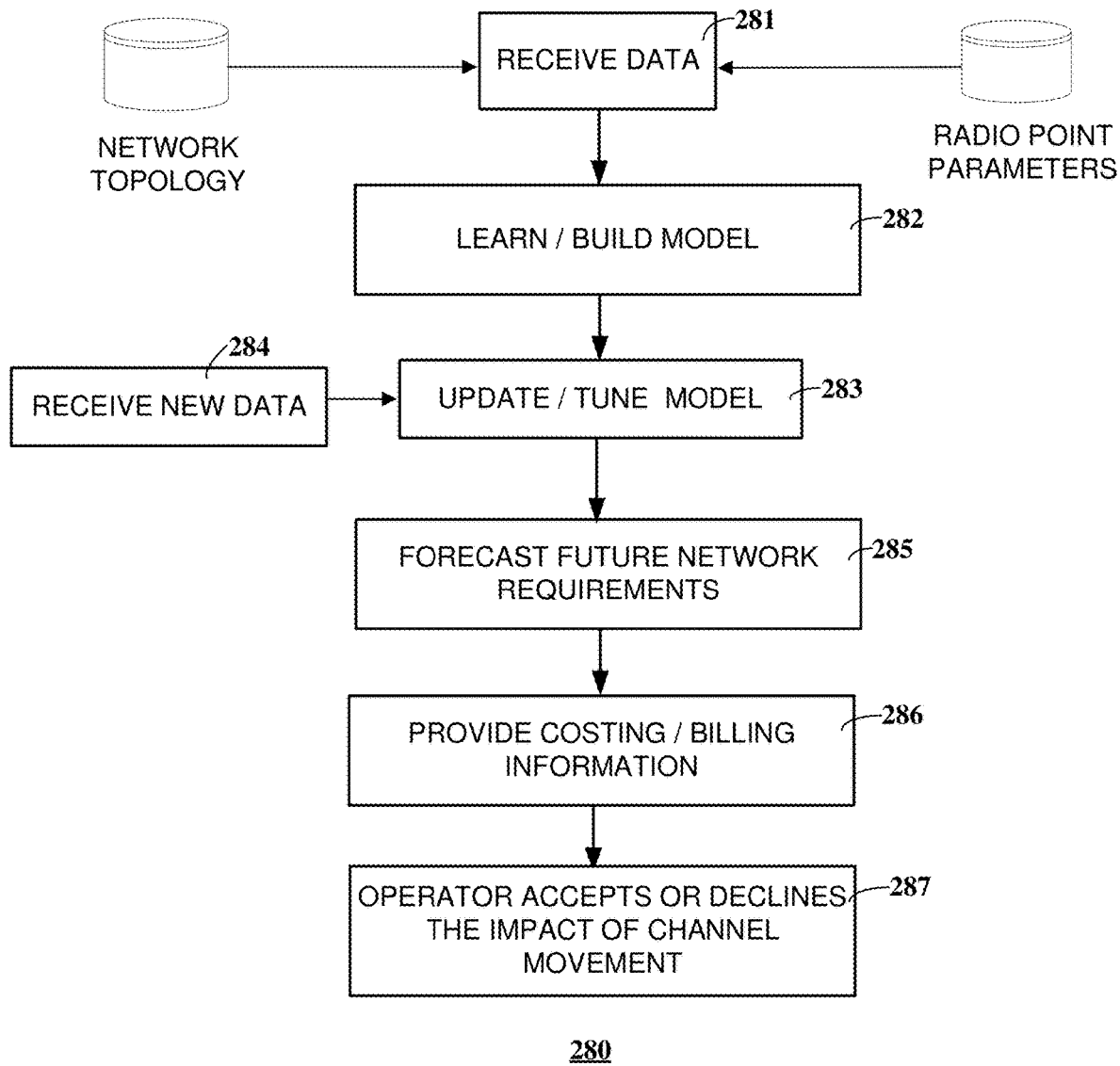

FIG. 2J illustrates a method 280 for building a model for building a machine learning model or artificial intelligence model for real time, on demand selection of beamforming parameters and channel assignment in a mobility network, in accordance with various aspects described herein. The method 280 of FIG. 2J may be performed at any suitable location or device with network data access to devices of the mobility network. In particular embodiments, the method 280 may be performed at a centrally located software defined domain controller (SDD). The SDD may be used to collect information about device and network parameters, as well as information about the physical environment and the radio environment and, based on this information, the centrally located SDD may optimize bandwidth and beam formation for channels throughout a network, for example to have maximum reachability. As used herein, "centrally located" means located at one or more devices in data communication with other devices of a network or combination of networks that have available required data for processing by the SDD or may implement the results of the SDD processing. Processing may be distributed over two or more processing systems. However, in embodiments a single instantiation of the SDD controller is used as the centrally located SDD.

At step 281, the method 280 includes providing data to the machine learning model. In embodiments, the data collected from the topology manager about network topology is received from storage. Further, the data received from the test and trace process about network connections and radio point parameters is received at step 282. Any other pertinent, available data is received at step 282.

At step 282, the model is built using the information received at step 281. Any suitable machine learning model may be used including neural networks, decision trees, random forest models, a K Means clustering algorithm, a linear regression algorithm, an artificial neural network, a K nearest neighbors algorithm, or a recurrent neural network (RNN), an artificial neural network (ANN) or a convolutional neural network (CNN) model. Moreover, other models may be selected including combinations of models. Some or all of the information received at step 282 may be used in some embodiments as training data for the model.

Further, step 282 includes a process of updating or tuning the model. In embodiments a process according to FIG. 2C may be used to fine tune the model to a required level of accuracy where predicted values adequately match actual values. Further, new or additional data may be received from any source, step 284. For example, if the topology manager may determine that a network device has been taken off line and the network topology has now changed, that information will be received at step 284. Similarly, if a radio point is updated to have a different antenna with a different number of antenna matrix elements, that information will be received at step 284. At step 283, the model may be continuously updated and tuned including newly received data from step 284 so that the model is ready and available for maximum accuracy.

At step 285, using information learned from the various data sources, the SDD controller implementing the model can learn to take decisions on launching a fresh channel in the network. The new channel can have specific beamforming parameters. Further, the SDD controller implementing the model can select a channel with preferred characteristics, such as maximum spectral efficiency as discussed above in connection with FIG. 2D, for example.

Further at step 285, the method 280 may include a process of predicting and forecasting future trends in bandwidth requirements as well as requirements for other radio resources. Such predications may allow the radio access network to adapt to changing conditions including unique events such as operation during a major event such as the Olympic games, a cricket or football match, World Cup events and so forth. Similarly, using learning over a period of time, the SDD controller employing the model may be able to predict and forecast future demand in the network and future expansion needs. This may include build-out of the network in new geographic areas as well as upgrade of services in the network in particular areas such as an upgrade from 4G cellular service to 5G cellular service.

In step 286, the method 280 in some embodiments provides costing or billing information for the on-demand traffic setup. For example, some events may require supplemental network support. Examples include private events with a substantial number of attendees and one-time events such as a championship match or movie premier at a particular location. In all of these cases, there may be a sudden surge in demand for wireless access services. In such a case, planning ahead, the service provider may desire to provide the attendees with consistent, reliable service include good reachability from the network. However, providing such service at a limited location may require additional costs to establish the on-demand traffic management, channel selection and beam formation. Some network slices may be able to be moved or reassigned to the impacted location due to its high priority. In this context, channel slices may refer to bandwidth segments which may be assigned or reassigned to different users.

Further, there may be other concurrent events with similar high priority. Moving resources such as assigned network slices away from such concurrent events may not be possible because of other priorities. Therefore, the method 280 at step 286 may include searching for other high priority scenarios that would be impacted by moving or reassigning the network slice.

For example, the SDD controller using the model may determine a suitable channel with suitable beam formation for a particular downlink to a particular UE device or group of UE devices. If a channel slice or bandwidth of frequencies movement, the channel may be allocated by the SDDC and communication on the channel may commence.

On the other hand, if the network equipment forming a channel slice with the required beam formation arrays is not available, the SDD controller must perform an algorithm or other process to find a channel slice having the required beam formation ability and which can be moved or reassigned to the new channel with no or limited traffic impact. In embodiments, if enough channel slices with required beam formation equipment are available, step 286 may mark those channels for movement with information about placement for destination UE devices.

Thus, if moving or reassigning a channel slice to enable beam formation and channel selection in accordance with the aspects described here, will have an impact on other users, the method 280 will notify the network operator and provide options to accept the impacts and proceed with the movement of the channel slices, or select other options. If the operator accepts the impact of the channel movement, step 287, then the method 280 may move or reassign the frequency channels with appropriate beam formation using the new channels. New channels may then be launched with required beam formation in the created hole of frequencies or channels.

If at step 287, the operator declines to move the channels, then the method 280 may provide an options to enable switching the channels of interest to a new assignment, with appropriate beam formation, during a suitable time. An example of a suitable time is during a maintenance window, when the channels of interest are not normally being used. Further, the method 280 may include a step of providing the network operator the option of automatically making the switch of unused channels during the maintenance window or other suitable time, or making the switch manually.

Figure 2K:
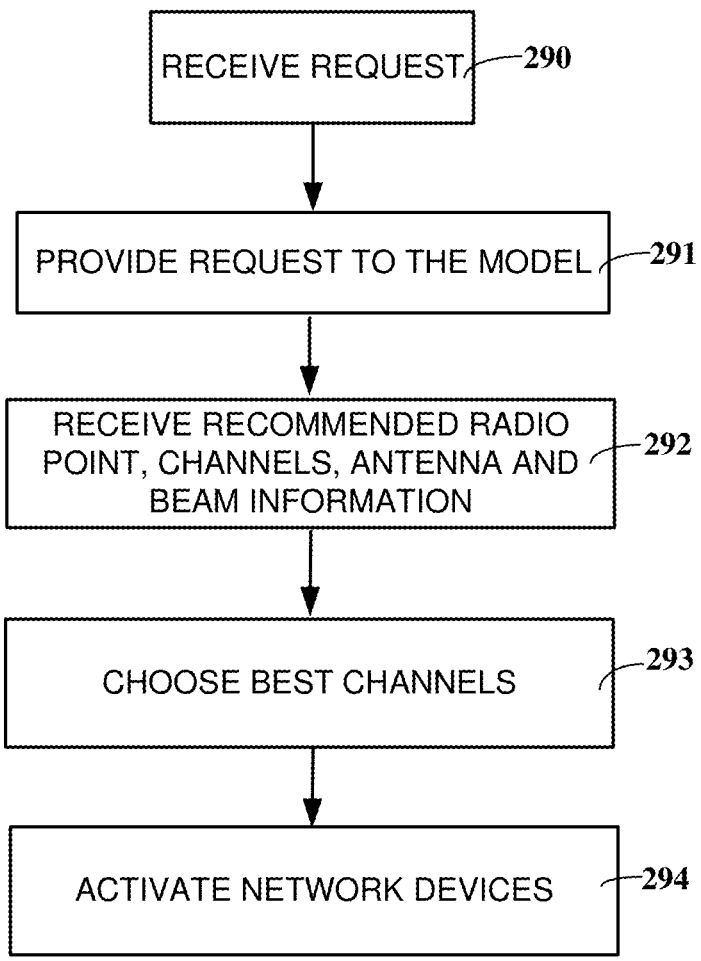

FIG. 2K depicts an illustrative embodiment of a method 289 for on-demand prediction, recommendation and allocation of radio channels with required beam formation information in a mobility network in accordance with various aspects described herein. The method 280 of FIG. 2J may be performed at any suitable location or device with network data access to devices of the mobility network. In particular embodiments, the method 289 may be performed at a centrally located software defined domain (SDD) controller.

At step 290, the method 289 includes a process of receiving a request for a new channel definition. The request may be received, for example, at the SDD controller over a network from a component of the mobility network seeking to establish a downlink from the network to a UE device operating at a particular location. In general, the request needs to be responded to substantially in real time, with a delay on the order of milliseconds or tens of milliseconds. For example, the user of the UE device expects a rapid connection to the network, especially if the user is engaged in an activity such as streaming video. Further, if a data session or voice session is being handed off from a first gNB to a second gNB, the handover procedure must occur rapidly to avoid dropping the voice or data session.

At step 291, information about the request is provided to a model such as the machine learning model developed in a process such as the method of FIG. 2J. Any suitable information from the request may be provided to the model. The model develops a recommendation for a particular radio point such as a gNB for establishing a downlink and a best space for launching the channel based on the model results.

At step 292, the SDD controller receives from the model a recommended radio point, information defining the channel or channels, antenna information and beam formation information. The recommendation is based on the information learned by the model about the network including network topology, current information such as traffic levels, available radio points and channels, and predictions of future requirements.

At step 293, to launch the new channel, the SDD controller will automatically select the number of channels and array antennas with required beam formation and location of those channels in the coverage area to form the downlink to the UE device. The selection may be based on the recommendation receive from the model as well as other information collected by the SDD controller. For example, the SDD controller may have additional information about other UE devices active in the network or an unplanned outage of a portion of the network or network components. Use of the recommendation from the model plus other information by the SDD controller allows the SDD controller to make on-demand, near-real time decisions about channel formation and assignment.

At step 294, the SDD controller cooperates with other components of the network to activate necessary devices. For example, information is communicated to the selected radio point to form the necessary channel. The communicated information may include parameters for frequency and bandwidth, required antenna elements for beam formation and location of the channels in the coverage area.

Due to non-linearities in the environment and due to a varying gain profile, different channels with appropriate beam formation may have different properties. For example, no two channels will have same gain profile and hence may have different reach. However, the novel method of FIG. 2I, FIG. 2J and FIG. 2K, the SDD controller is able to pick best suited channels with required beam formation to ensure the required reachability and coverage area for the beam are attained. For example, the recommendation from the model may include combining a channel from the lower range of the 3.5 GHz band and a channel from the 10 GHz band (see FIG. 2G). The SDD controller can select the necessary radio resources in the network to combine the two specified channels to provide the required reachability. Thus, the SDD controller is able to select channel location and number of channels with required array information for antennas to enable beam formation based upon data collected from the radio-point and other network information, and to launch the channel with the appropriate beam formation. This ensures reliable communication for the UE device and the network as well as an optimal use of network resources.

The disclosed procedure and apparatus provide a novel of allocating spectrum in a mobility network using a SDD controller. The SDD controller provides a new way to create a hole in the spectrum of available frequencies for freshly launched channels with appropriate beam formation. Further, the procedure and apparatus may use a model such as a machine learning model to defragment spectrum with minimal to no impact on existing traffic in the network. The SDD controller can compute the impact of each movement of channel and provide to the network operators options for taking action, either automatically or manually.

While for purposes of simplicity of explanation, the respective processes are shown and described as a series of blocks in FIG. 2H, FIG. 2I, FIG. 2J and FIG. 2K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of systems, and methods presented in FIG. 1, FIG. 2A, FIG. 2B, FIG. 2C, and FIG. 2H, FIG. 2I, FIG. 2J and FIG. 2K. For example, virtualized communication network 300 can facilitate in whole or in part selecting optimum parameters for launching a new channel in a radio network, including selecting a radio point, selecting bandwidth for the channel and selecting an antenna configuration to obtain beam reachability to a user equipment device from the selected radio point. Information about the radio access network, including network topology, equipment and parameters, is collected and used with a model to select the parameters for launching the new channel.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs);

reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
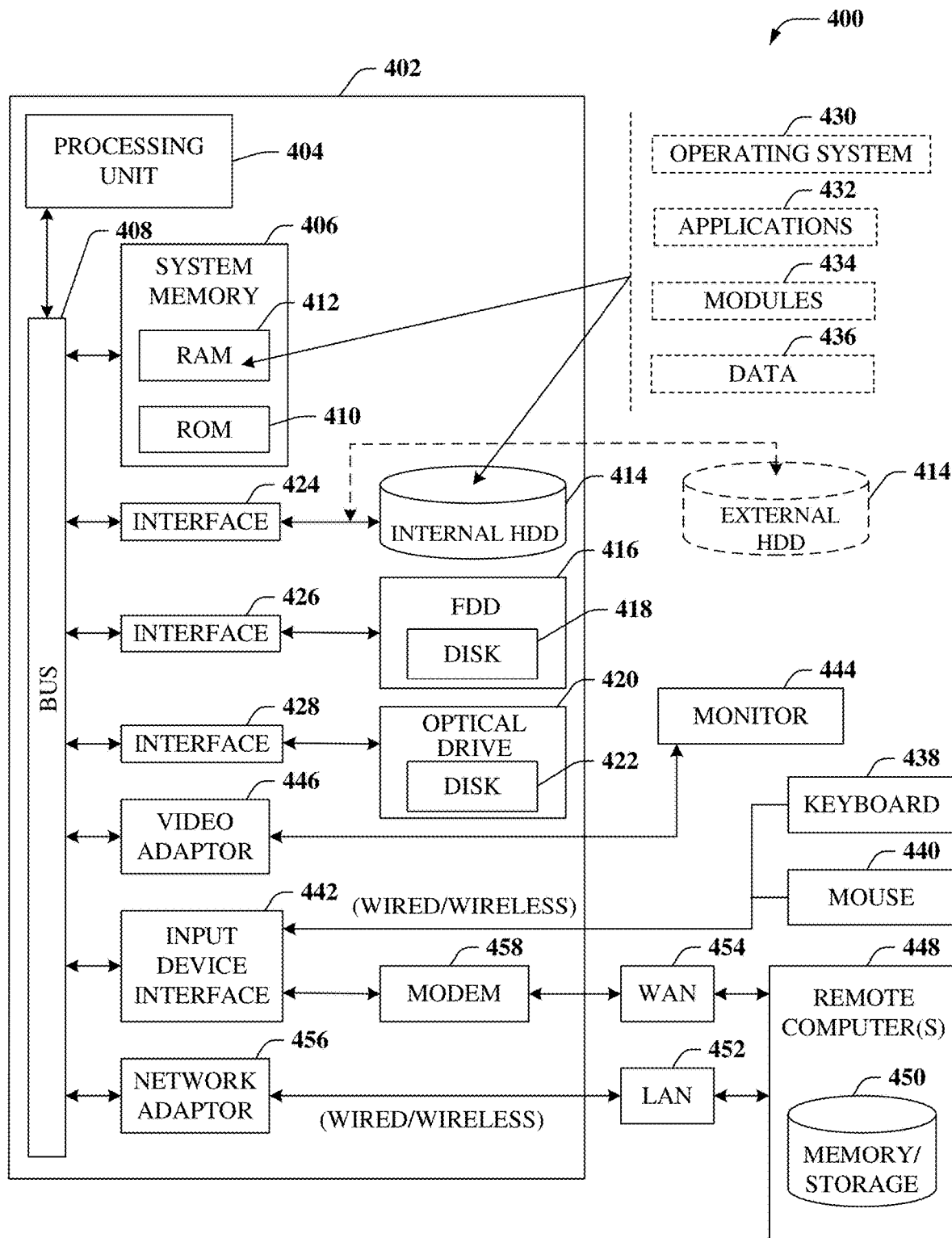
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part selecting optimum parameters for launching a new channel in a radio network, including selecting a radio point, selecting bandwidth for the channel and selecting an antenna configuration to obtain beam reachability to a user equipment device from the selected radio point. Information about the radio access network, including network topology, equipment and parameters, is collected and used with a model to select the parameters for launching the new channel.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
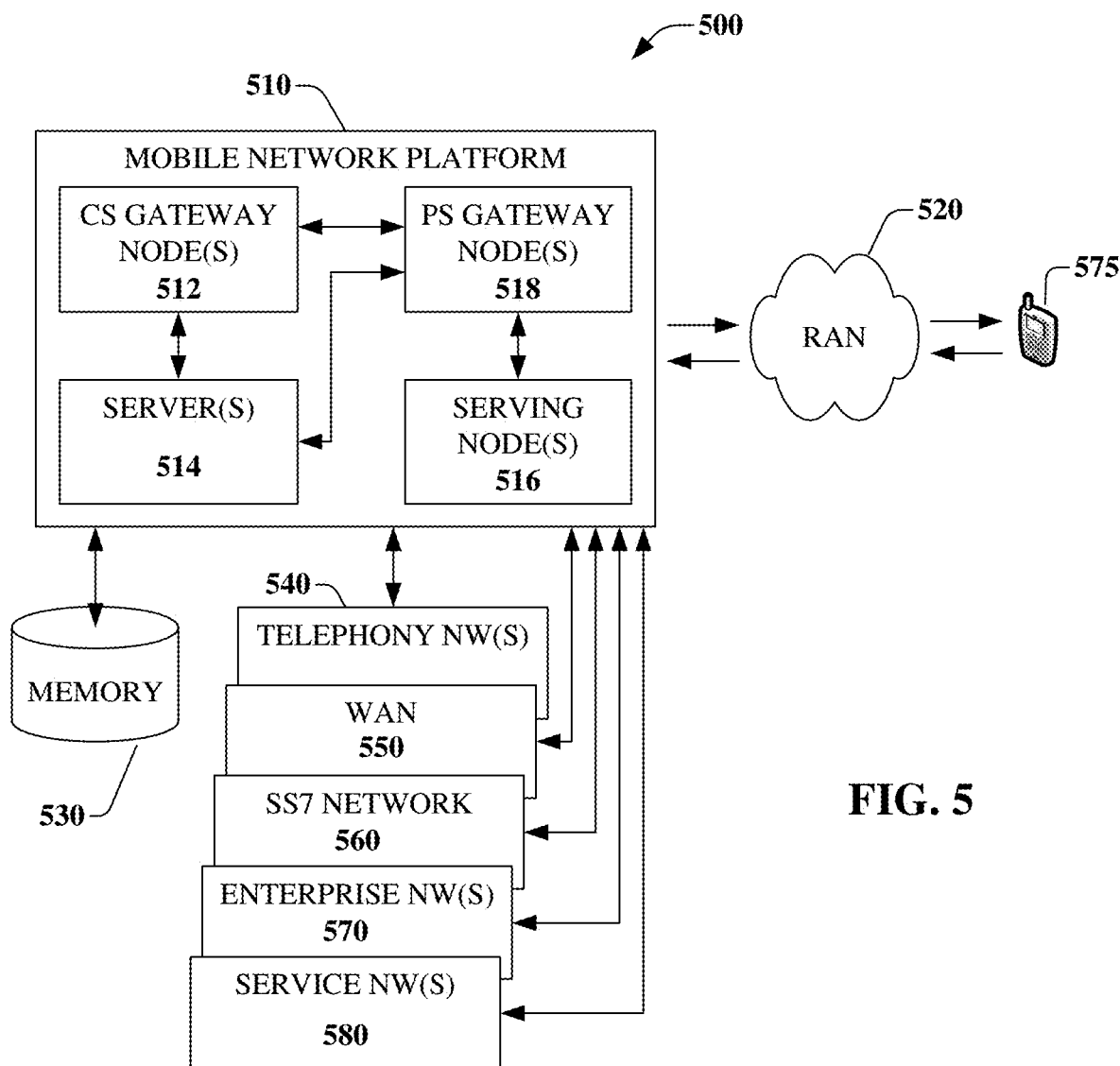
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part selecting optimum parameters for launching a new channel in a radio network, including selecting a radio point, selecting bandwidth for the channel and selecting an antenna configuration to obtain beam reachability to a user equipment device from the selected radio point. Information about the radio access network, including network topology, equipment and parameters, is collected and used with a model to select the parameters for launching the new channel. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
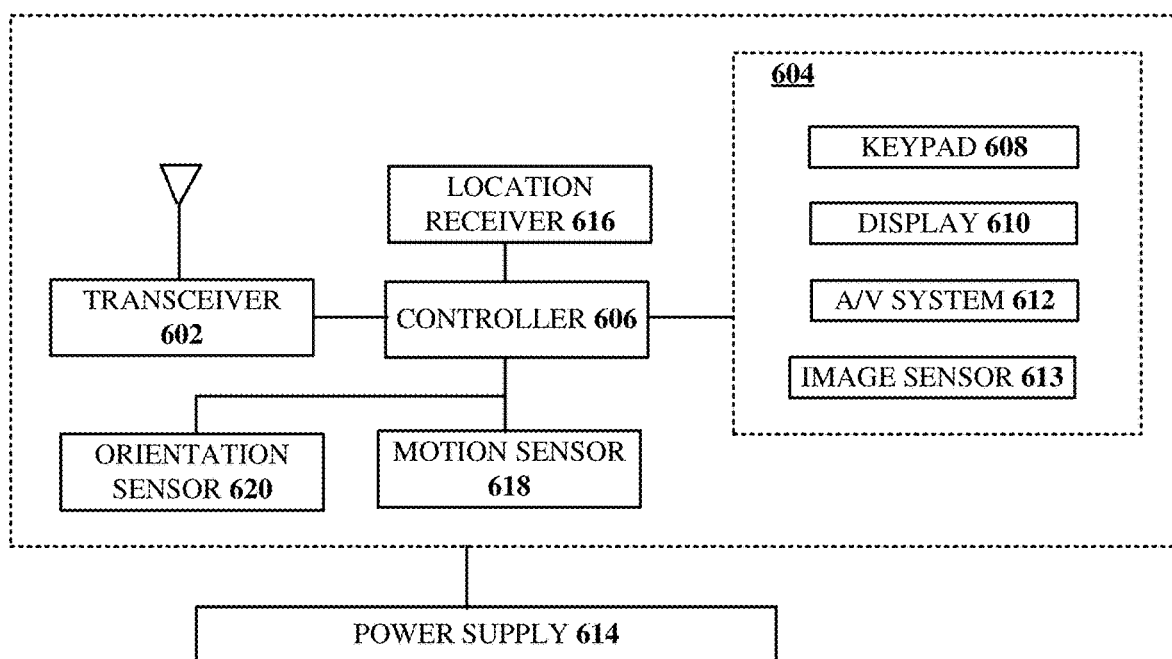
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part selecting optimum parameters for launching a new channel in a radio network, including selecting a radio point, selecting bandwidth for the channel and selecting an antenna configuration to obtain beam reachability to a user equipment device from the selected radio point. Information about the radio access network, including network topology, equipment and parameters, is collected and used with a model to select the parameters for launching the new channel.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600.

In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi 33, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
        collecting network information for a mobility network, wherein the collecting the network information comprises processing the network information at a central controller serving the mobility network, wherein the collecting the network information further comprises:
            collecting topology information regarding a topology of the mobility network, the topology information including information defining nodes of the mobility network and connections between nodes of the mobility network; and
            collecting radio point parameters for a plurality of the nodes of the mobility network;
        building, in the central controller, a machine learning model, wherein the building comprises building the machine learning model using the network information; and
        allocating, by the central controller, radio channels of the mobility network, wherein the allocating is based on a recommendation of the machine learning model.

2. The device of claim 1, wherein the operations further comprise:

communicating information about the allocated radio channels to one or more nodes of the mobility network.

3. The device of claim 1, wherein the operations further comprise:
detecting a modification of the topology of the mobility network; and
updating the topology information of the mobility network to reflect the modification.

4. The device of claim 1, wherein the building the machine learning model comprises:
training the machine learning model with training data, the training data comprising data of the network information;
obtaining a test output of the machine learning model based on a test input;
obtaining an expected output based on the test input; and
suspending training the machine learning model when a difference between the test output and the expected output is less than a tolerance value.

5. The device of claim 1, wherein the operations further comprise:
receiving a request for a new channel definition;
providing information about the request to the machine learning model; and
receiving, from the machine learning model, a recommended channel definition.

6. The device of claim 5, wherein the receiving, from the machine learning model, the recommended channel definition comprises:
receiving, from the machine learning model, one or more of a recommended radio point of the mobility network, information defining a channel or channels, antenna information, and beam formation information for establishing a downlink connection from the recommended radio point to a user equipment device in a service area of the recommended radio point of the mobility network.

7. The device of claim 5, wherein the receiving, from the machine learning model, the recommended channel definition comprises:
receiving, from the machine learning model, information defining one or more radio channels for beamforming of a downlink connection; and
receiving, from the machine learning model, information defining array antenna configuration of a recommended radio point of the mobility network.

8. The device of claim 6, wherein the operations further comprise:
communicating information about the recommended channel definition to the recommended radio point of the mobility network for establishing the downlink connection.

9. The device of claim 5, wherein the receiving, from the machine learning model, the recommended channel definition further comprises:
receiving, from the machine learning model, information defining two or more recommended channel options; and
selecting, by the central controller, one recommended channel option of the two or more recommended channel options, wherein the selecting is based on reachability and coverage area for a user equipment device in a service area of a recommended radio point of the mobility network.

10. The device of claim 1, wherein the central controller comprises a software defined domain (SDD) controller.

11. The device of claim 1, wherein the operations further comprise:
forecasting future network requirements based at least in part on outputs of the machine learning model.

12. A method, comprising:
collecting, by a processing system including a processor, network information for a mobility network, wherein the collecting the network information comprises processing the network information at a central controller serving the mobility network, wherein the collecting the network information further comprises:
collecting topology information regarding a topology of the mobility network, the topology information including information defining nodes of the mobility network and connections between nodes of the mobility network; and
collecting radio point parameters for a plurality of the nodes of the mobility network;
generating, by the processing system, in the central controller, a machine learning model, wherein the generating comprises generating the machine learning model using the network information; and
allocating, by the processing system, by the central controller, radio channels of the mobility network, wherein the allocating is based on a recommendation of the machine learning model.

13. The method of claim 12, further comprising:
communicating, by the processing system, information about the allocated radio channels to one or more nodes of the mobility network.

14. The method of claim 12, further comprising:
detecting, by the processing system, a modification of the topology of the mobility network; and
updating, by the processing system, the topology information of the mobility network to reflect the modification.

15. The method of claim 12, wherein the generating the machine learning model comprises:
training, by the processing system, the machine learning model with training data, the training data comprising data of the network information;
obtaining, by the processing system, a test output of the machine learning model based on a test input;
obtaining, by the processing system, an expected output based on the test input; and
suspending, by the processing system, training the machine learning model when a difference between the test output and the expected output is less than a tolerance value.

16. The method of claim 12, further comprising:
forecasting, by the processing system, future network requirements based at least in part on outputs of the machine learning model.

17. A non-transitory machine-readable medium, comprising executable instructions that, when executed by a processing system including a processor, facilitate performance of operations, the operations comprising:
collecting network information for a mobility network, wherein the collecting the network information comprises processing the network information at a central controller serving the mobility network, wherein the collecting the network information further comprises:
collecting topology information regarding a topology of the mobility network, the topology information including information defining nodes of the mobility network and connections between nodes of the mobility network; and collecting radio point parameters for a plurality of the nodes of the mobility network;

constructing, in the central controller, a machine learning model, wherein the constructing comprises constructing the machine learning model using the network information; and allocating, by the central controller, radio channels of the mobility network, wherein the allocating is based on a recommendation of the machine learning model.

18. The non-transitory machine-readable medium of claim 17, wherein the operations further comprise;

communicating information about the allocated radio channels to one or more nodes of the mobility network.

19. The non-transitory machine-readable medium of claim 17, wherein the constructing the machine learning model comprises:

training the machine learning model with training data, the training data comprising data of the network information;

obtaining a test output of the machine learning model based on a test input;

obtaining an expected output based on the test input; and suspending training the machine learning model when a difference between the test output and the expected output is less than a tolerance value.

20. The non-transitory machine-readable medium of claim 17, wherein the operations further comprise:

forecasting future network requirements based at least in part on outputs of the machine learning model.

\* \* \* \* \*